(No Model.) 2 Sheets—Sheet 1.
A. BARR & W. STROUD.
RANGE FINDER.
No. 567,675. Patented Sept. 15, 1896.
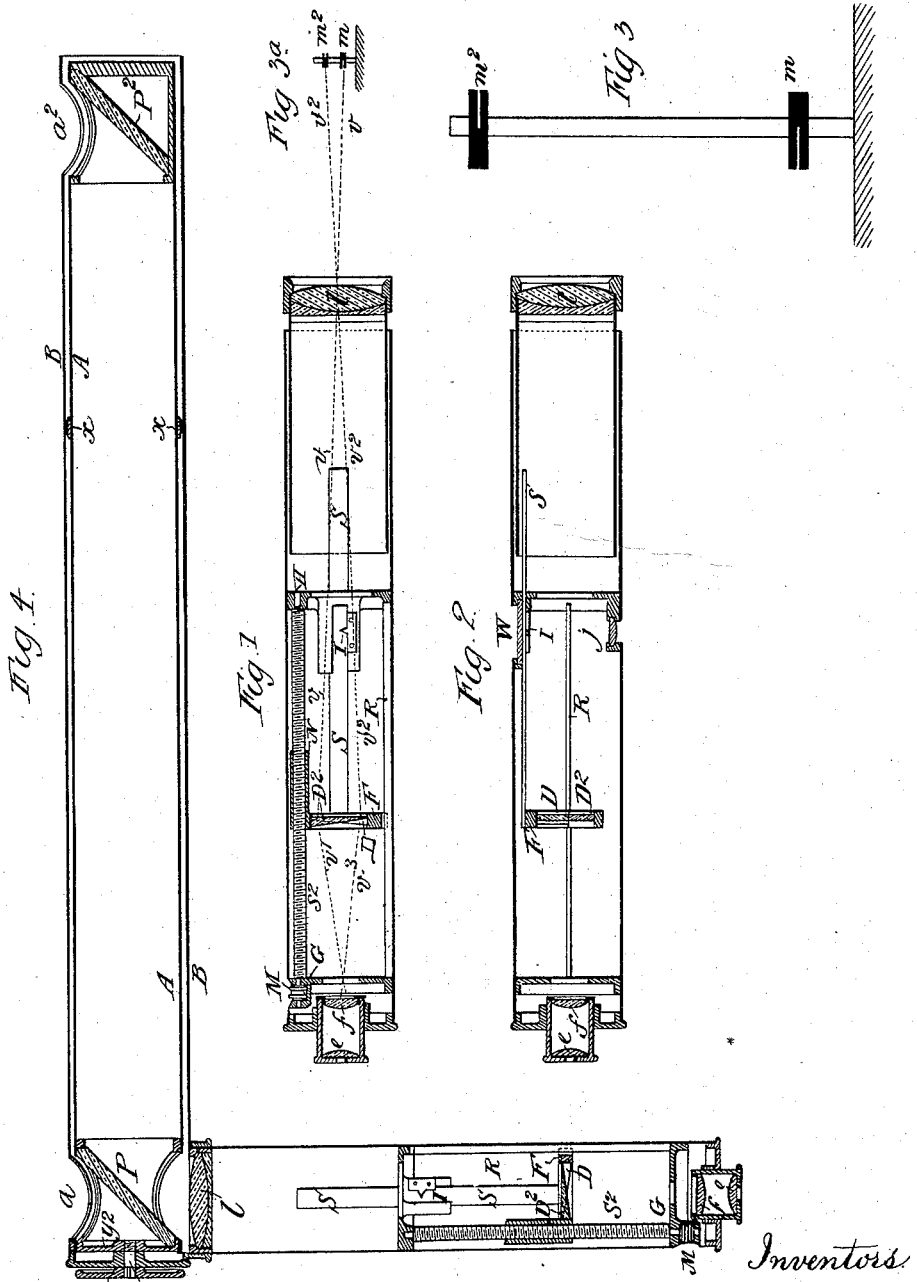
Witnesses
Walter E. Allen.
Edward Q. Knight
Inventors
Archibald Barr.
William Stroud.
By Knight Bros.
Attorneys.

(No Model.) 2 Sheets—Sheet 2.
A. BARR & W. STROUD.
RANGE FINDER.
No. 567,675. Patented Sept. 15, 1896.
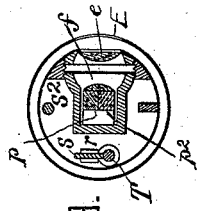
FIG. 9.
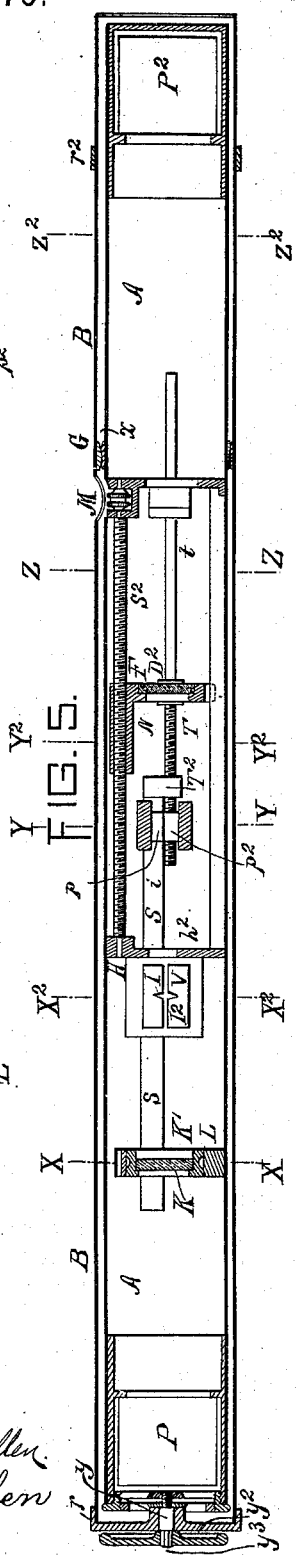
FIG. 5.
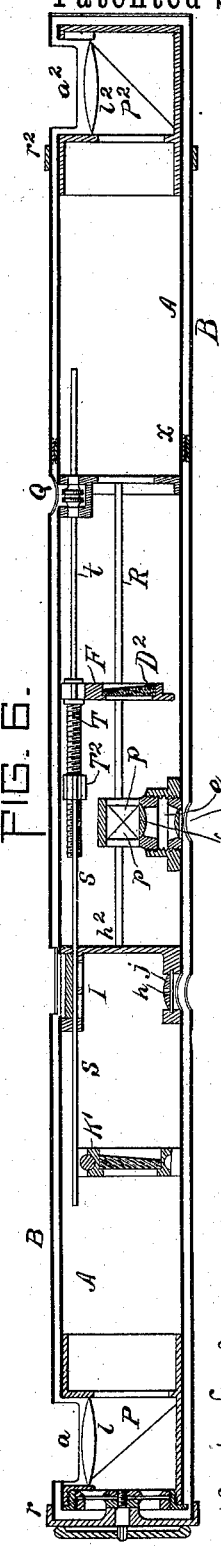
FIG. 6.
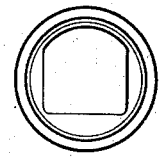
FIG. 12.
FIG. 8.
FIG. 7.
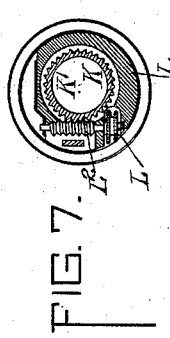
FIG. 11.
FIG. 10.
Witnesses.
W. Ellwood Allen
Walter Allen
Inventors.
Archibald Barr.
William Stroud.
By Knight Bro
Attys.

United States Patent Office.

ARCHIBALD BARR, OF GLASGOW, SCOTLAND, AND WILLIAM STROUD, OF LEEDS, ENGLAND.

RANGE-FINDER.

SPECIFICATION forming part of Letters Patent No. 567,675, dated September 15, 1896.

Application filed January 19, 1895. Serial No. 535,566. (No model.) Patented in England June 30, 1888, No. 9,520, and July 9, 1889, No. 11,025; in France July 4, 1889, No. 199,368; in Italy July 4, 1889, LVI, 43; in Germany July 4, 1889, No. 51,751, and in Austria-Hungary January 23, 1890, No. 29,449 and No. 59,925.

*To all whom it may concern:*

Be it known that we, ARCHIBALD BARR, a resident of Glasgow, Scotland, and WILLIAM STROUD, a resident of Leeds, England, subjects of the Queen of Great Britain and Ireland, have invented Improvements in Range-Finders, of which the following is a specification.

We have obtained patents covering this invention in Great Britain, No. 9,520, dated June 30, 1888, and No. 11,025, dated July 9, 1889; in France, No. 199,368, dated July 4, 1889; in Italy, LVI, 43, dated July 4, 1889; in Germany, No. 51,751, dated July 4, 1889, and in Austria-Hungary, No. 29,449 and No. 59,925, dated January 23, 1890.

The object of our invention is to provide an optical telemeter or range-finder capable of easily and rapidly determining the distance of objects from an observing-station.

Our invention further relates to means for reducing to a minimum the possibility of derangement or injury of such instrument during use or transport.

The chief characteristic of an instrument constructed in accordance with our invention consists in the formation of two images of an object situated at the point the distance of which is required, and in the bringing into coincidence or alinement these two images by means of a refracting-prism of small angle moving along the path of the rays, so that the position of the prism serves as an indication of the range of the object observed. When the instrument is required for accurate surveying purposes, and there is no difficulty in carrying to the distant point a special object having two marks upon it at a known distance apart, we prefer to construct the instrument so that the observation is made by bringing into alinement or coincidence the images of the said marks. On the other hand, for military and naval purposes, or for rapid surveying, (when a special object cannot be carried to the point whose distance is to be determined,) we construct the instrument so that two images of one part of an object at the distant station are brought into alinement or coincidence. In either case the motion of one image relatively to the other is effected by the same means—viz., by the movement of a refracting-prism of small angle placed between the image and the object-glass by which the image is formed.

Our invention consists in the novel features of construction hereinafter described and claimed.

Figures 1 and 2 represent longitudinal sections at right angles to each other of an instrument constructed in accordance with our invention and arranged for accurate surveying work. Fig. 3 represents an elevation of a staff having upon it two marks $m$ $m^2$ at a known distance apart, which staff is to be held at the point the distance of which is to be determined. Fig. $3^a$ shows in elevation the position of the staff represented in Fig. 3 relatively to the telemeter, as represented in Fig. 1. Fig. 4 is a longitudinal section of the range-finder, having at right angles to it a tube or frame-piece. Figs. 5 and 6 are longitudinal sections showing a modified construction for compactness. Figs. 7 to 12 are transverse sections thereof through the lines X X, $X^2$ $X^2$, Y Y, $Y^2$ $Y^2$, Z Z, $Z^2$ $Z^2$, respectively.

The telemeter consists of a telescope, Figs. 1 and 2, of which $l$ is an object-glass, and $e$ $f$ the eyepiece. A frame F, Figs. 1 and 2, carries a refracting-prism D, constructed preferably of crown and flint glass, so as to be achromatic in the manner well understood by opticians. This prism D lies to one side in the tube, as seen in Fig. 2, so as to be traversed by only half of the beam of light proceeding from the objective $l$ to form an image in the focus of the eyepiece. The other half of the beam may proceed directly, but preferably it is caused to traverse a flat plate of glass of about the mean thickness of the prism D; or, again, it may be caused to traverse a second prism $D^2$, similar to the first but oppositely directed, as shown in Fig. 1. These prisms D $D^2$ may be placed with their thick edges together or with their thin edges together, but we prefer to place them side by side, as shown in elevation in Fig. 1 and in plan in Fig. 2.

The framework F, Figs. 1 and 2, carries a nut N, Fig. 1, traversed by a screw $S^2$, supported by bearings H and G and actuated by a milled head M. The frame F at the extremity remote from N is guided upon a rod R, attached to the tube. A scale S is fixed to the frame F and moves with it. This scale, which is conveniently constructed of ivory or other transparent or translucent material, travels past an index I, behind which there is a window W. A lens $j$, situated at the opposite side of the tube from the scale, assists the observer to read its indications. The height of the staff and its distance are shown upon a greatly-reduced scale. It will be evident that a ray of light $v$, coming from $m$ through the objective $l$, will, in traversing the prism D, be refracted into such a direction as $v'$. A ray of light $v^2$, coming from $m^2$, will similarly be refracted in passing through the prism $D^2$ into such a direction as $v^3$. Images of $m\ m^2$ are thus formed at the focus of the eyepiece $e\ f$. Suppose these images to be seen in exact alinement or coincidence, and then suppose that the staff, Fig. $3^a$, is brought nearer to the instrument while the distance $m\ m^2$ remains the same, the angle between the rays $v\ v^2$ will be increased. The image of $m$ will therefore appear higher than before; the image of $m^2$ lower. The images of the marks will not appear in coincidence. To bring the images of the marks into coincidence the prisms must be moved farther from the eyepiece $e\ f$. Thus the position which the prisms must occupy in order to produce coincidence of the images of the marks depends upon the distance of the staff. Consequently the scale S may be graduated so as to indicate this distance.

To adapt this instrument for the determination of the distance of inaccessible objects we substitute for the staff and place in front of it and at right angles to it a tube or frame-piece A, Fig. 4, carrying two reflecting-prisms or mirrors P $P^2$ having their reflecting-surfaces parallel or nearly so. The mirror P is silvered over half its surface only, or it may be constructed so as to lie in front of half only of the objective $l$. A ray of light from a distant object is reflected from $P^2$ to P, and thence through the objective $l$, whereas another ray of light comes directly to the lens $l$ through the unsilvered portion of or past the reflector P. It will be at once evident that the angle between the latter direct ray and the ray reflected from $P^2$ and P (which come from one part of the distant object) will depend upon the distance of the object and the length between P and $P^2$ (which length is constant) just as the angle between the rays $v\ v^2$, Fig. 1, depended upon the distance of the staff, Fig. $3^a$, and the distance $m\ m^2$, (which latter distance is constant.) The position of the refracting-prisms D $D^2$ in Fig. 4 indicates therefore the distance of the object, as above described with reference to Fig. 1 and 2.

In order to avoid any derangement of the parallelism between the reflecting-surfaces P and $P^2$, due to bending of the tube or frame-piece A, we support the latter within a second tube or frame-piece B in such a manner that any moderate bending of B will not cause deformation of A. One mode of accomplishing this is shown in Fig. 4. At one end the tube A has attached to it a disk $y^2$, into which a pin $y$ is fixed. This pin projects through a hole in the end plate of the tube B, which hole may be slightly widened out at its ends, so as to give the pin $y$ freedom to work. At some distance from the other end of the tube A there is fixed a ring $x$, the outer surface of which is a portion of a sphere which fits steadily within the tube B. The pin $y$, above referred to, may simply have a head outside the end of B, or it may carry a disk $y^3$, by means of which the tube A may be rotated within the tube B, so as to bring blank portions of the tube opposite the apertures $a\ a^2$ when the instrument is not in use. The instrument may be rendered more compact by constructing it in the modified manner shown in Figs. 5 to 12. Instead of carrying the beam of light reflected from one end $a^2$ of the instrument to the other $a$, as in Fig. 4, and then reflecting it again into a direction approximately coincident with that of the beam arriving directly at $a$, in the modified form we reflect both of these beams inward by placing the reflecting-surfaces P $P^2$ at right angles to each other, or approximately so, as shown in Fig. 6, and again reflecting them from two reflectors $p\ p^2$, placed at the center of the instrument, and instead of using a separate telescopic part, as in Fig. 4, we form the telescopic part, acting in the manner above described, within the tube A itself by placing at each end of the tube one half of the objective $l$, or preferably a complete objective $l\ l^2$, as shown in Fig. 6.

A, as before, represents the tube or frame-piece carrying the reflectors P $P^2$ (having their planes of reflection at about forty-five degrees to the axis of the tube) and objectives $l\ l^2$. The reflectors we sometimes construct of parallel glass mirrors or of speculum metal, or, again, of totally-reflecting prisms. In the latter case we sometimes combine reflector and objective by grinding spherically one or both of the surfaces traversed by the light and cementing lenses $l\ l^2$, respectively, on these surfaces, the materials and the curvatures being such that the combination is achromatic. Such combinations we shall designate by the term "objective prisms." Where separate objectives and reflectors are used the lenses may be placed so as receive the light before reflection, as shown, or they may be within the tube A and receive the light after reflection. Between these reflectors or objective prisms are placed the reflecting-prisms $p\ p^2$, with their reflecting-planes parallel or nearly parallel to the reflecting-planes of the prisms P $P^2$, respectively, and placed the one above the other, as shown in Fig. 5. To the prisms $p$ $p^2$ (called hereinafter "eyepiece-prisms") is cemented a plane convex lens $f$, Fig. 6, which forms the field-lens of an ordinary positive eyepiece. The corresponding eye-lens of the eyepiece is indicated by $e$, and this can be screwed in or out of its support, so as to furnish the necessary adjustment for focus. As before, in the path of the beam of light forming one of the partial images is placed the refracting-prism $D^2$ in the frame F, provided with a nut N, through which passes the screw $S^2$, actuated by the milled head M. The screw $S^2$ is supported in the tube A by means of bearing G H, which, while permitting the screw to turn, prevent it from moving longitudinally. R, as before, is a guide for the lower part of the holder F. The arrangement above described is such that the luminous rays coming from the object whose range is required are reflected by the objective prisms P $P^2$, and again by the eyepiece-prisms $p$ $p^2$, so as to form two separate partial images, the one above, the other below, the line of meeting of the faces of the eyepiece-prisms $p$ $p^2$ at the plane where the field-lens $f$ is cemented to these prisms. The object observed through the instrument will consequently appear in the form of two partial images, of which one is reflected by one of the eyepiece-prisms $p$ $p^2$, the other by the other. It is clear that by moving the deflecting-prism $D^2$ the image of the part of the object observed by rays reflected by $P^2$ will be displaced with reference to the image of the contiguous part of the object observed by rays reflected from P, and the amount of this displacement will depend on the position of $D^2$, so that by moving $D^2$ in one direction or the other it is possible to bring the two images into correct coincidence or alinement, and thus, as before, the position of the prism $D^2$ in the tube is a measure of the range. To indicate the range, there is attached to the holder F the graduated scale S, placed at the side of the tube remote from the observer. At a distance of about two and one-half inches (six to 6.5 centimeters) to the left of the eyepiece $e$ there is placed the scale-lens or half-lens $j$. (See also Fig. 8.)

I is an index for reading the indications of the scale. The window W is prolonged below the scale, as is indicated at V, Figs. 5 and 8, while $h$, Figs. 6 and 8, is a hole pierced through the lens $j$ (or a small flat glass ground and polished on the convex surface) and $I^2$ is a pointer seen projected on the object whose range is required. This arrangement of hole $h$, pointer $I^2$, and window V permits the observer to rapidly direct the instrument on any object, for the eye which views the scale has command of a large field of view through the hole $h$ and portion V of the window, so that when the pointer $I^2$ has been brought (by a suitable motion of the instrument) to cover any particular object that object will be found greatly magnified in the field of view of the right eyepiece.

The instrument is so put together that when the prism $D^2$ occupies a given position and when the rays coming from the object observed to the two extremities of the base are, practically speaking, parallel, as, for example, when a star is being viewed, the two partial images of the object observed appear in exact alinement, and then the scale reads an infinite distance. If now the rays coming to the two extremities of the instrument make an angle with one another, as, for example, when the object viewed is at a distance, say, of one thousand yards, the partial images do not appear in exact coincidence, but the partial images can be adjusted to exact coincidence by moving the deflecting-prism $D^2$ along the tube in the manner already described, and the scale (which moves with the deflecting-prism) is graduated to indicate the distance of the object in the new position, (in the above example one thousand yards.)

The object of the arrangement of scale-lens, scale, and eyepiece, as described above, is to allow the observer to use both eyes at the same time, or nearly at the same time. With one eye, in fact, he observes the object viewed and with the other he reads the scale, without removing his eyes from the instrument.

In our instrument we have provided for two sorts of adjustment, which we call, respectively, the adjustment for "halving" and the adjustment for "coincidence." The object of the first is to realize the condition that the two partial images when brought into coincidence or alinement are seen without duplication or deficiency in the object observed; that is to say, the two partial images form a complete one, no part of the object being missing and no part duplicated. The adjustment for coincidence serves to adjust the instrument so that when the partial images of any object are seen in perfect coincidence the scale indicates the true distance of the object viewed. We have for simplicity omitted the arrangements for adjustment from Figs. 1, 2, and 4, but we proceed to describe them with reference to Figs. 5 and 6. One way only of performing each of these adjustments is shown. The adjustment for halving can be effected by means of a prism K of very small angle supported in a circular holder $K'$, Figs. 5, 6, and 7, this in its turn being supported in the piece L, fixed to the tube A. The circumference of the holder $K'$ is provided with teeth (forming a worm-wheel) gearing into a worm $L^2$, which rests in bearings in the piece L and which carries a milled head $L^3$. By this means the prism can be rotated in its own plane. If then the prism edge is parallel to the paper in Fig. 5 and perpendicular to the paper in Fig. 6, or approximately so, as is represented by the inclination of its faces, as shown in Fig. 6, rotation of the prism will effect the requisite halving adjustment, since when the prism is rotated so that its thin edge rises when viewed as in Fig. 6 the partial image seen in the prism $p$ will rise, and thus more of the object will be seen above the line of separation of the prisms $p$ $p^2$, and consequently if the two partial images form an incomplete one—part of the object appearing to be missing at the junction of the partial images—this defect is corrected. If, on the other hand, a part of the object is seen both above and below the line of separation, a rotation of the prism K in the reverse direction will carry the upper partial image downward and effect the required adjustment.

The adjustment for coincidence is best done by moving the scale with reference to the deflecting-prism, so as to vary the reading for a given position of the deflecting-prism.

T is a screw capable of turning relatively to the holder F, but moving longitudinally with the holder. This screw traverses a nut $T^2$, fixed to the scale. The piece on which the screw T is formed is prolonged at the far side, as shown at $t$. The piece $t$ has a rectangular section and freely traverses a rectangular opening in the milled head Q, supported from the tube A. It is clear that if we rotate the head Q the scale S is displaced relatively to the deflecting-prism, so that if the partial images of an object at a known distance appear in coincidence the scale can be adjusted to indicate the true distance of the object.

We have used corresponding letters to indicate corresponding parts in all the figures.

We claim—

1. A telemeter, or range-finder, in which the distance of a distant object is determined by the bringing into coincidence, or alinement, two images of the same part of the object, whose distance is required, by aid of a refracting-prism, movable longitudinally along the beam of light, which forms one of the said images, in such a manner, that the position of the prism indicates the required distance.

2. A telemeter, or range-finder, in which the distance of a distant object is determined by the bringing into coincidence, or alinement, the images of two separate parts of the object, whose distance is required, by aid of a refracting-prism, movable longitudinally along the beam of light, which forms one of the said images, in such a manner, that the position of the prism indicates the required distance.

3. A telemeter, or range-finder, in which the distance of a distant object is determined by the bringing into coincidence, or alinement, two images of the same part of the object, whose distance is required, by aid of two refracting-prisms, moving longitudinally along the beams of light, which form the two images respectively, in such a manner, that the position of the prisms indicates the required distance.

4. A telemeter, or range-finder, in which the distance of a distant object is determined by the bringing into coincidence, or alinement, the images of two separate parts of the object, whose distance is required, by aid of two refracting-prisms, moving longitudinally along the beams of light, which form the two images respectively, in such a manner, that the position of the prisms indicates the required distance.

5. A telemeter or range-finder comprising a telescope having an object-glass and an eyepiece, a frame carrying a prism and located between the object-glass and the eyepiece, means whereby the frame is adjusted, a scale constructed of transparent or translucent material and adjustable with the frame, a window for admitting light to the scale, an index and a lens for reading the indications; substantially as described.

6. A telemeter or range-finder comprising a telescope having an object-glass and an eyepiece, a frame formed with a nut and carrying a prism, and located between the object-glass and the eyepiece the screw-bearings, a screw having a milled head, mounted in the bearings and working in the nut for adjusting the frame, the guide-rod for the frame, a scale adjustable with the frame, an index, and a lens for reading the indications; substantially as described.

In testimony whereof we have signed our names to this specification in the presence of two witnesses.

ARCHIBALD BARR.
WILLIAM STROUD.

Witnesses:
JOHN LIDDLE,
ARTHUR HARTLEY YUILE.